US009179391B2

(12) United States Patent
Zhou et al.

(10) Patent No.: US 9,179,391 B2
(45) Date of Patent: Nov. 3, 2015

(54) METHOD FOR OFFLOADING PROCESSING SERVICE, COMMUNICATION APPARATUS AND NETWORK SYSTEM

(75) Inventors: Zongrong Zhou, Shenzhen (CN); Hua Liu, Shenzhen (CN); Peisong Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 849 days.

(21) Appl. No.: 13/339,215

(22) Filed: Dec. 28, 2011

(65) Prior Publication Data

US 2012/0163298 A1 Jun. 28, 2012

Related U.S. Application Data

(63) Continuation of application No. PCT/CN2011/079672, filed on Sep. 15, 2011.

(30) Foreign Application Priority Data

Dec. 24, 2010 (CN) .......................... 2010 1 0605392

(51) Int. Cl.
*H04W 4/00* (2009.01)
*H04W 40/02* (2009.01)
*H04W 76/02* (2009.01)
*H04W 84/18* (2009.01)
*H04L 29/06* (2006.01)

(52) U.S. Cl.
CPC ............... *H04W 40/02* (2013.01); *H04L 69/22* (2013.01); *H04L 69/16* (2013.01); *H04W 76/02* (2013.01); *H04W 84/18* (2013.01)

(58) Field of Classification Search
CPC ......... H04L 45/30; H04L 45/38; H04L 45/52; H04L 40/12; H04L 69/16; H04L 69/22; H04L 76/02; H04L 84/18
See application file for complete search history.

(56) References Cited

U.S. PATENT DOCUMENTS

| 2009/0168675 | A1  | 7/2009 | Tao |
| 2010/0077102 | A1  | 3/2010 | Lim et al. |
| 2010/0077109 | A1* | 3/2010 | Yan et al. .................. 710/17 |

(Continued)

FOREIGN PATENT DOCUMENTS

| CN | 101128047 A | 2/2008 |
| CN | 101350781 A | 1/2009 |

(Continued)

OTHER PUBLICATIONS

Office Action issued in corresponding Chinese Patent Application No. 201010605392.6, mailed Jul. 3, 2013, 24 pages.

(Continued)

*Primary Examiner* — Lonnie Sweet
(74) *Attorney, Agent, or Firm* — Brinks Gilson & Lione

(57) ABSTRACT

A method for offloading processing service, comprising: acquiring a first packet carrying payload data and transmitted from a user equipment; identifying a service type of the first packet by using Deep Packet Inspection DPI technique; determining a transmission channel interface that corresponds to the identified service type according to a first correspondence relationship between service types and transmission channel interfaces; and transmitting, via the determined transmission channel interface, the first packet to a destination end to which the user equipment requests for access.

6 Claims, 10 Drawing Sheets

(56) References Cited

U.S. PATENT DOCUMENTS

| | | | |
|---|---|---|---|
| 2010/0097944 A1* | 4/2010 | Wang et al. | 370/250 |
| 2010/0097995 A1 | 4/2010 | Murphy et al. | |
| 2010/0192225 A1* | 7/2010 | Ma et al. | 726/23 |

FOREIGN PATENT DOCUMENTS

| | | | |
|---|---|---|---|
| CN | 101370312 A | | 2/2009 |
| CN | 101505236 A | | 8/2009 |
| CN | 101883393 A | | 11/2010 |
| CN | 101938401 A | | 1/2011 |
| CN | 102075566 A | | 5/2011 |
| WO | 2010/102570 A1 | | 9/2010 |
| WO | WO 2010127614 A1 | | 11/2010 |
| WO | WO 2011000241 A1 | | 1/2011 |

OTHER PUBLICATIONS

Office Action issued in corresponding Chinese Patent Application No. 201010605392.6, mailed Mar. 25, 2013.

International Search Report and Written Opinion of the International Searching Authority issued in corresponding PCT Patent Application No. PCT/CN2011/079672, mailed Nov. 3, 2011.

Extended European Search Report issued in corresponding European Patent Application No. 11799062.2, mailed Nov. 28, 2012.

LTE, "$3^{rd}$ Generation Partnership Project; Technical Specification Group Services and System Aspects; Local IP Access and Selected IP Traffic Offload" (Release 10) 3GPP 23.829. v1.2.0, Aug. 2010.

Office Action issued in corresponding Chinese Patent Application No. 201010605392.6; mailed Jul. 4, 2012.

* cited by examiner

METHOD FOR OFFLOADING PROCESSING SERVICE, COMMUNICATION APPARATUS AND NETWORK SYSTEM

CROSS-REFERENCE TO RELATED APPLICATIONS

This application is a continuation of International Application No. PCT/CN2011/079672, filed on Sep. 15, 2011, which claims priority to Chinese Patent Application No. 201010605392.6, filed on Dec. 24, 2010, both of which are hereby incorporated by reference in their entireties.

FIELD OF THE INVENTION

The present invention relates to the field of communication technology, and particularly to a method for offloading processing service, a communication apparatus and a network system.

BACKGROUND OF THE INVENTION

In recent years, application of 3G (third-generation) services have become more and more extensively in the world, and intelligent terminals and data card-based netbooks have been widely used, resulting in a huge increase of wireless Internet services. If such networking services and traditional services (such as short message services, voice services) are both transmitted over mobile networks, overload in the PS (Packet Switched) domain will be caused necessarily with an adverse influence on quality of the traditional services; while at the same time, quality of the networking services would be impaired as well due to the limitation by bandwidth of the mobile networks and apparatus capacity.

A networking service offloading method is available in the prior art, in which when a user needs the networking services, a specific APN (Access Point Name) is set and a PDP activation request is made by using the specific APN, and an SGSN (Serving GPRS Support Node) and a DNS (Domain Name System) server on the Internet cooperate to determine according to the specific APN that the service the user presently needs is the networking service and then to notify an SGSN module in a base station to transmit the user's networking service to the Internet network via a Gi interface at the base station; for a non-specific APN, an SGSN in the mobile network is selected and the user's traditional service is transmitted over the mobile network. Optionally, both the networking service transmitted via the Gi interface at the base station and the traditional service transmitted over the mobile network pass through a VAS (Value-Added Server) which calculates a fee for a value-added service in a case where the current service that the user is enjoying is the value-added service (such as incoming call display, GPRS traffic service set, or the like).

During making the present invention, the inventors have found that, in the method of offloading networking services provided by the prior art, it is necessary for the user to set a specific APN; since different APNs may need to be set for the networking services provided by different telecommunication operators, the user is required to understand the meaning of the APN thereby posing a high requirement for the capability of the user, which becomes a bottleneck for usage of 3G networking services.

SUMMARY OF THE INVENTION

Embodiments of the invention provide a method for offloading processing service, a communication apparatus and a network system to carry out automatic offloading of network traffic without any user's intervention.

An embodiment of the invention provides a method for offloading processing service, comprising:
acquiring a first packet carrying payload data and transmitted from a user equipment;
identifying a service type of the first packet by using Deep Packet Inspection (DPI) technique;
determining a transmission channel interface that corresponds to the identified service type according to a first correspondence relationship between service types and transmission channel interfaces; and
transmitting, via the determined transmission channel interface, the first packet to a destination end to which the user equipment requests for access.

A method for offloading processing service comprises:
acquiring a second packet transmitted from a user equipment, wherein the second packet carries therein information of a destination end;
determining a transmission channel interface that corresponds to the information of the destination end carried in the second packet according to a second correspondence relationship between information of the destination end and transmission channel interfaces; and
transmitting, via the determined transmission channel interface, the second packet to the destination end that corresponds to the information of the destination end carried in the second packet.

A communication apparatus comprises:
an acquisition unit for acquiring a first packet carrying payload data and transmitted from a user equipment;
a service type identification unit for identifying a service type of the first packet by using Deep Packet Inspection (DPI) technique;
a service transmission channel interface determination unit for determining a transmission channel interface that corresponds to the identified service type according to a first correspondence relationship between the service type and the transmission channel interface; and
a transmission unit for transmitting, via the determined transmission channel interface, the first packet to the destination end to which the user equipment requests for access.

A network system comprises a communication apparatus as described above and a destination end device, wherein the destination end device is configured to receive packets from a user equipment that are transmitted by the communication apparatus.

A communication apparatus comprises:
an acquisition unit for acquiring a second packet transmitted from a user equipment, wherein the second packet carries therein information of a destination end;
a rapid transmission channel interface determination unit for determining a transmission channel interface that corresponds to the information of the destination end carried in the second packet according to a second correspondence relationship between information of destination ends and transmission channel interfaces; and
a transmission unit for transmitting, via the determined transmission channel interface, the second packet to the destination end that corresponds to the information of the destination end carried in the second packet.

A network system comprises a communication apparatus as described above and a destination end device, wherein the destination end device is configured to receive packets from a user equipment that are transmitted by the communication apparatus.

A network system comprises a network element of a radio access network, and a service offloading apparatus and a destination end device in communication with the network element of the radio access network, wherein the network element of the radio access network is configured to acquire a packet carrying payload data and transmitted from a user equipment and transmit, via a transmission channel interface determined by the service offloading apparatus, the packet to a destination end device to which the user equipment requests for access, the service offloading apparatus is configured to identify a service type of the packet by using Deep Packet Inspection (DPI) technique and determine the transmission channel interface that corresponds to the identified service type according to maintained correspondence relationship between service types and transmission channel interfaces, and the destination end device is configured to receive the packet.

Accordingly, according to the embodiments of the invention, the service type of the packet with payload is determined by using the DPI technique after the packet is acquired from the user equipment. Then a corresponding transmission channel interface is determined according to the correspondence relationship between service types and transmission channel interfaces, and the packet is transmitted via the transmission channel interface. As such, since the traditional services and the networking services can correspond to the respective transmission channel interfaces, it is possible to offload the networking service from the traditional service without any user's intervention on APN setting. Alternatively, after the packet transmitted from the user equipment is received, a transmission channel interface that corresponds to the information of the destination end carried in the packet is determined according to the correspondence relationship between information of destination ends and transmission channel interfaces, and the packet is transmitted via this transmission channel interface. Since the server providing the traditional services and the server providing the networking services correspond to their respective transmission channel interfaces, it is possible to offload the networking services from the traditional services without any user's intervention on APN setting.

BRIEF DESCRIPTION OF THE DRAWINGS

Brief description of the drawings to be used for embodiments is given in order to describe the technical solutions of embodiments of the invention more clearly. Obviously, those drawings are simply presented to illustrate some embodiments of the invention. It is possible for those skilled in the art to derive the other drawings from them without any inventive work.

DETAILED DESCRIPTION OF THE EMBODIMENTS

Figure 1:
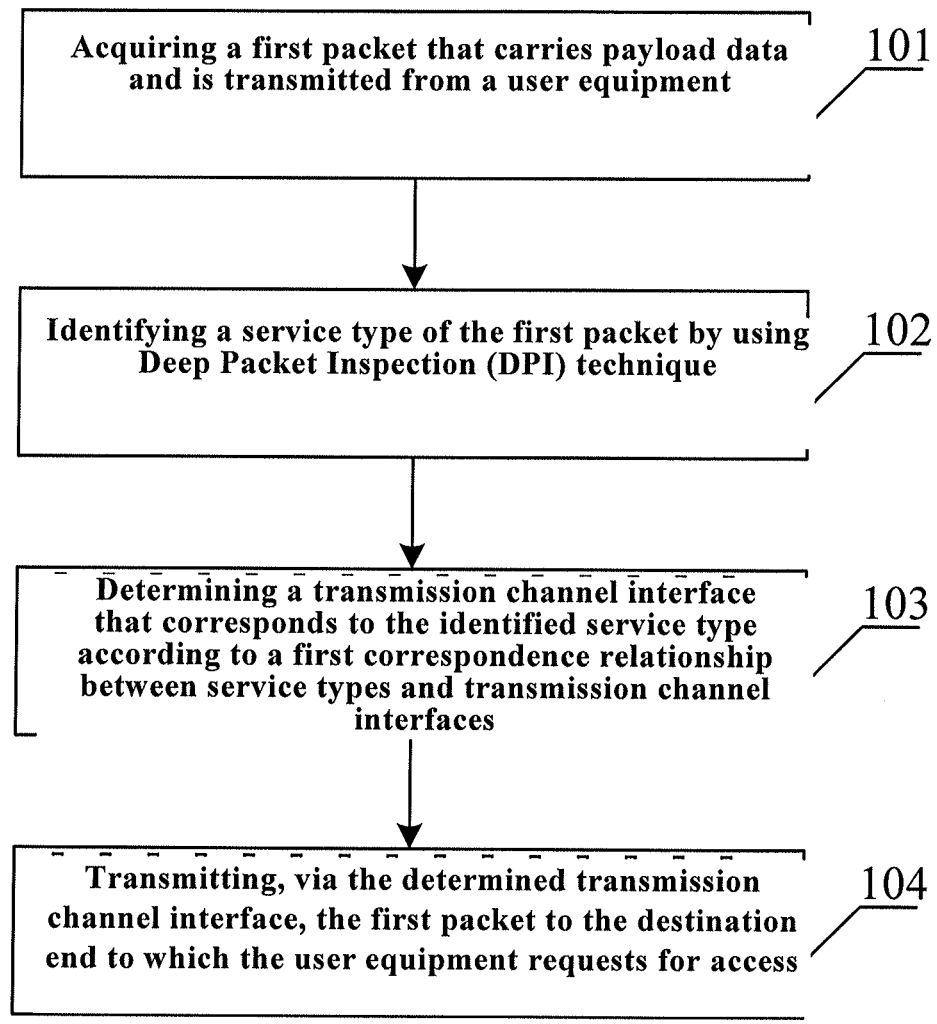
FIG. 1 is a flowchart showing a method for offloading processing service provided by an embodiment of the invention.

Referring to FIG. 1, an embodiment of the present invention provides a method of offloading processing service, which comprises steps as follows.

101. A first packet carrying payload data and transmitted from a user equipment is acquired.

102. A service type of the first packet is identified by using a Deep Packet Inspection (DPI) technique.

103. A transmission channel interface which corresponds to the identified service type is determined according to a first correspondence relationship between service types and transmission channel interfaces.

Here, the first correspondence relationship between service types and transmission channel interfaces can be either statically configured or dynamically obtained, wherein the first correspondence relationship between service types and transmission channel interfaces can be dynamically obtained by obtaining the first correspondence relationship between service types and transmission channel interfaces which is dynamically configured by the user through a Graphical User Interface (GUI).

104. The first packet is transmitted, via the determined transmission channel interface, to a destination end which the user equipment requests for access.

Here, the entity which carries out the embodiment of the invention may be a network element of an access network (more specifically, may be a network element of a Radio Access Network (RAN)), a Serving GPRS Support Node (SGSN), or a Gateway GPRS Support Node (GGSN). Here, the network element of the access network may be a base station Node B or a Radio Network Controller (RNC), and the first packet carrying payload data may be an IP packet carrying payload data.

Alternatively, the entity which performs the steps 101, 102 and 103 may be an external device independent from the network element of the access network, the SGSN and the GGSN. The external device notifies the network element of the access network after it determines the transmission channel interface that corresponds to the identified service type. In the step 104, the network element of the access network transmits, via the determined transmission channel interface, the first packet to the destination end which the user equipment requests for access.

Here, the destination end which the user equipment requests for access is a server which the user equipment request for access. This server is an apparatus which provides service to the user equipment and can be another user equipment.

There are different requirements for establishment of transmission links with respect to different transmission layer protocols. For example, for the Transmission Control Protocol (TCP), it is necessary to pre-establish a TCP connection before the first packet carrying payload data is transmitted, while for the User Datagram Protocol (UDP), it is unnecessary to pre-establish a connection. Due to this reason, the method further comprises steps as follows.

The network element of the access network captures a link establishment request message sent by the user equipment; if it is determined that a TCP connection is needed to be established according to the link establishment request message, a link is established from the network element of the access network to the user equipment and a link is established from the network element of the access network to the next-hop network element, with a TCP Proxy built in the network element of the access network as a relay; after the transmission channel interface for the first packet is determined and before the first packet is transmitted via the determined transmission channel interface to the destination end, when the established link from the network element of the access network to the next-hop network element is not the link that corresponds to the determined transmission channel interface, the established link from the network element of the access network to the next-hop network element is released and a link is re-established from the network element of the access network to the destination end via the determined transmission channel interface, in which case the first packet is transmitted, over the re-established link via the determined transmission channel interface, to the destination end which the user equipment requests for access, in the step 104.

Optionally, for a purpose of forwarding packets to the destination end rapidly when the user equipment accesses the destination end for the next time after the present access is finished or when other user equipments access the destination end, the second correspondence relationship between information of the destination end and the determined transmission channel interface is set after the step 104. Here, the information of the destination end includes the IP address and the port number of the destination end. Optionally, the information of the destination end may also include the transmission layer protocol applicable to the first packet. In this way, after a second packet is subsequently acquired, the information of the destination end is parsed from the second packet. The transmission channel interface that corresponds to the information of the destination end is determined according to the second correspondence relationship, and the second packet is transmitted to the destination end via the determined transmission channel interface. Here, the first and second packets represent two packets which are acquired at different time.

Accordingly, according to the embodiment of the invention, the service type of the packet carrying payload data is determined by using the DPI technique after the packet is acquired from the user equipment. Then a corresponding transmission channel interface is determined according to the correspondence relationship between service types and transmission channel interfaces, and the packet is transmitted by using this transmission channel interface. As such, since traditional services and networking services can correspond to the respective transmission channel interfaces, it is possible to offload networking services from traditional services without any user's intervention on APN setting.

Figure 2:
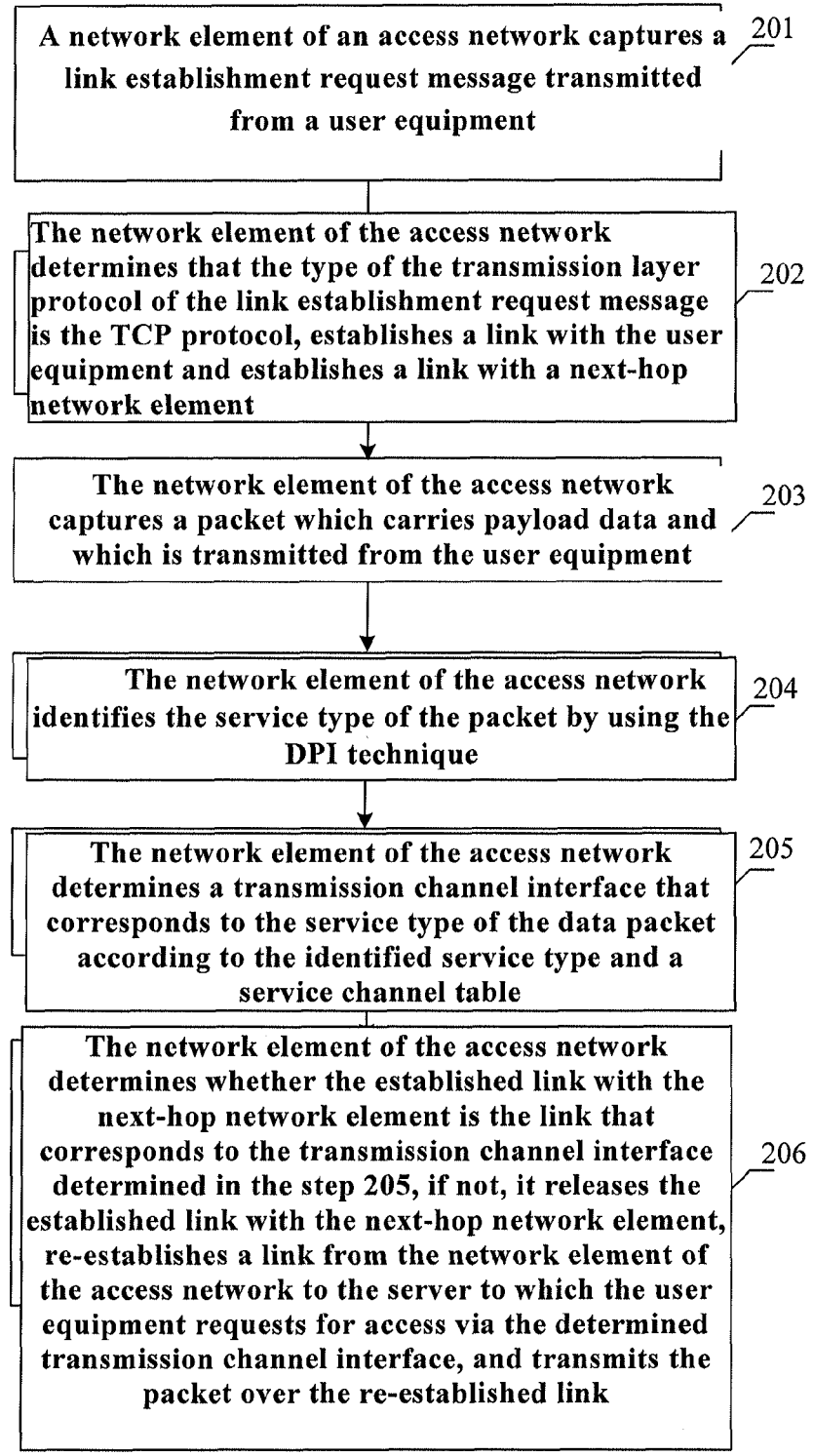
FIG. 2 is a flowchart showing a method for offloading processing service by using a service channel table based on the TCP protocol provided by the embodiment of the invention.

The above mentioned technical solutions provided by the present invention will be described in detail with reference to the following embodiment as illustrated in FIG. 2 in order for a clearer understanding of the technical solutions provided by the embodiments of the present invention.

Referring to FIG. 2, an embodiment of the present invention provides a method for offloading processing service by using a service-channel table. This method is suitable to the TCP protocol and, in particular, comprises the steps as follows.

201. A network element of an access network captures a link establishment request message sent by a user equipment, which carries therein the IP address and the port number of a server which the user equipment requests for access as well as the type of the transmission layer protocol.

202. The network element of the access network determines that the type of the transmission layer protocol of the link establishment request message is the TCP protocol, and the TCP Proxy built in the network element of the access network establishes a link between the user equipment and the TCP Proxy and establishes a link between the TCP Proxy and the next-hop network element.

Here, when the network element of the access network is a base station, the next-hop network element is a RNC, and when the network element of the access network is a RNC, the next-hop network element is an SGSN.

It is to be noted that this step converts a direct link between the user equipment and the next-hop network element to a link relayed via the TCP Proxy by using the TCP Proxy as a relay.

Specifically, the link between the user equipment and the TCP Proxy is established by interchanging three handshaking messages between the TCP Proxy and the user equipment, and the link between the TCP Proxy and the next-hop network element is established by interchanging three handshaking messages between the TCP Proxy and the next-hop network element. That is to say, in the embodiment of the present invention, the user equipment does not communicate directly with the server, but via the TCP Proxy built in the base station as a relay.

203. The network element of the access network captures the packet carrying payload data and transmitted from the user equipment.

In general case, the fourth IP packet sent from the user equipment to the server first appears as a packet carrying payload data. The first one out of the three beginning IP packets is a link establishment request message, and the second and third ones are the interaction messages during connection establishment between the TCP Proxy and the user equipment.

204. The network element of the access network identifies the service type of the packet carrying payload data by using the DPI technique.

Specifically, the service type of the packet is identified by way of characteristic identification, behaviour identification, suggestive identification or association identification. Specific implementation methods of identifying the service type of the packet using the characteristic identification, the behaviour identification, the suggestive identification or the association identification may known by referring to solutions in the prior art and is omitted here.

205. The network element of the access network determines the transmission channel interface that corresponds to the service type of the packet according to the identified service type and the service-channel table.

Correspondence relationship between service types and transmission channel interfaces is stored in the service-channel table, in which a transmission channel interface that corresponds to a service type is the optimal transmission channel interface for transmitting packets of that service type. If a transmission channel interface that corresponds to a service type is null or an invalid value, it means that the service or traffic is to be interrupted. Specifically, the service-channel table is shown in Table 1.

TABLE 1

| SERVICE TYPE | TRANSMISSION CHANNEL INTERFACE |
|---|---|
| Short-message service | Iub |
| Voice service | Iub |
| HTTP service | Gi |
| Blackberry service | |
| P2P service | Gi |

206. The TCP Proxy built in the network element of the access network judges whether the established link from the TCP Proxy to the next-hop network element is the link that corresponds to the transmission channel interface determined in the step 205. If no, the established link from the TCP Proxy to the next-hop network element is released and a link is re-established from the network element of the access network to the server which the user equipment requests for access via the determined transmission channel interface, and packets are transmitted by using the re-established link. If yes, packets are transmitted by using the established link.

Accordingly, according to the embodiment of the invention, after the network element of the access network captures a packet carrying payload data and transmitted from the user equipment, it determines the service type of the packet by using the DPI technique and then determines the transmission channel interface that corresponds to the service type of the packet according to the predetermined relationship between service types and transmission channel interfaces. With the TCP Proxy as a relay, the packet transmitted from the user equipment is sent to the server via the determined transmission channel interface. As such, since the traditional services and the networking services can correspond to different transmission channel interfaces, it is possible to offload the networking services from the traditional services without any user's intervention on APN setting.

Figure 3:
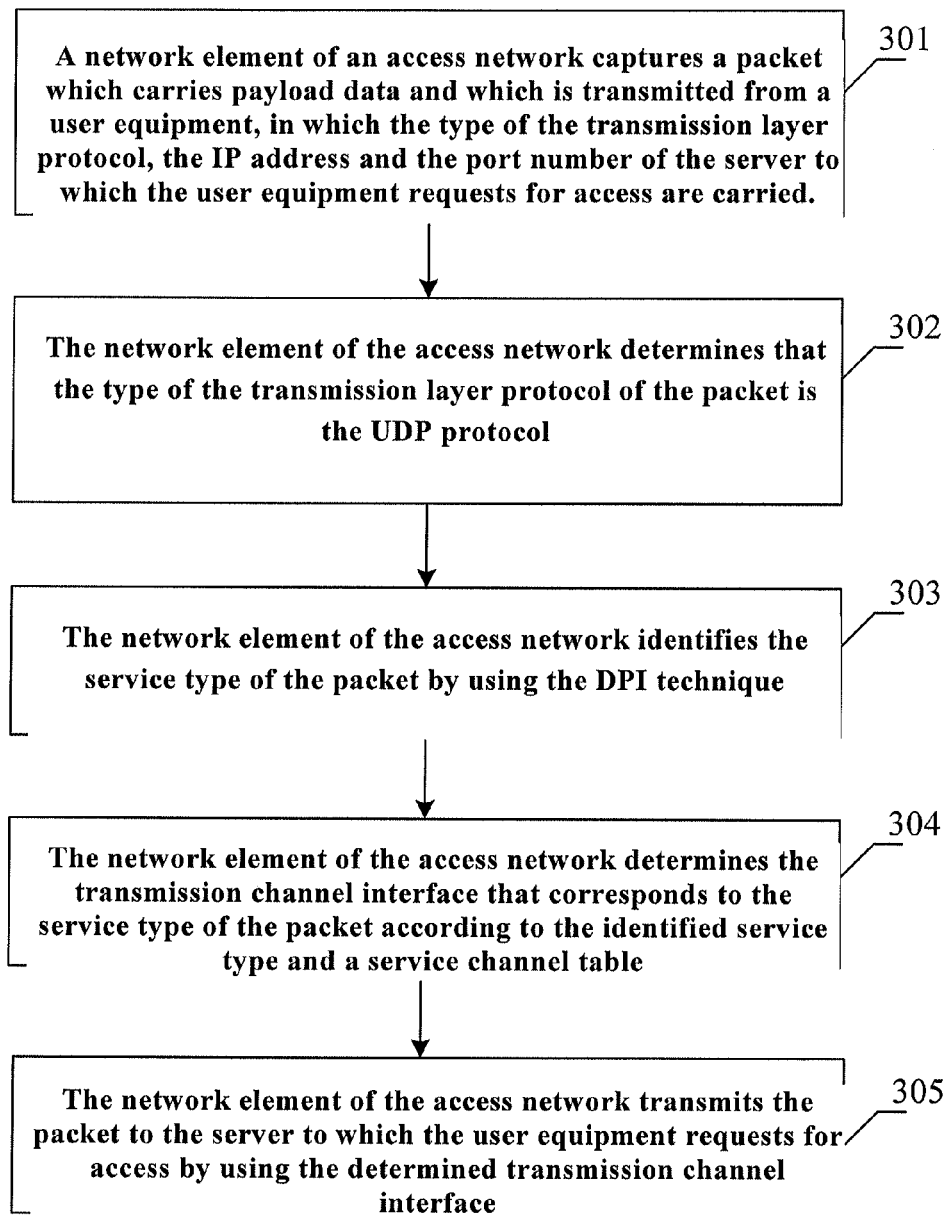
FIG. 3 is a flowchart showing a method for offloading processing service by using the service channel table based on the UDP protocol provided by the embodiment of the invention.

Referring to FIG. 3, an embodiment of the present invention provides a method for offloading processing service by using a service-channel table. The method is suitable for the UDP protocol and, in particular, comprises the steps as follows.

301. A network element of an access network captures a packet carrying payload data and transmitted from a user equipment. The packet carries therein the type of the transmission layer protocol as well as the IP address and the port number of a server which the user equipment requests for access.

For the UDP protocol, the first IP packet captured by the network element of the access network is a packet carrying payload data, and carries the type of the transmission layer protocol therein.

302. The network element of the access network determines that the type of the transmission layer protocol carried in the packet is the UDP protocol.

The description of the steps 303-304 is omitted herein as they are similar to the steps 204-205.

305. The network element of the access network transmits packets to the server which the user equipment requests for access by using the determined transmission channel interface.

Accordingly, according to the embodiment of the invention, after the network element of the access network captures a packet carrying payload data and transmitted from the user equipment, it determines the service type of the packet by using the DPI technique and then transmits the packet to the server via the corresponding transmission channel interface according to the predetermined relationship between service types and transmission channel interfaces. As such, since the traditional services and the networking services can correspond to different transmission channel interfaces, it is possible to offload the networking services from the traditional services without any user's intervention on APN setting.

Figure 4:
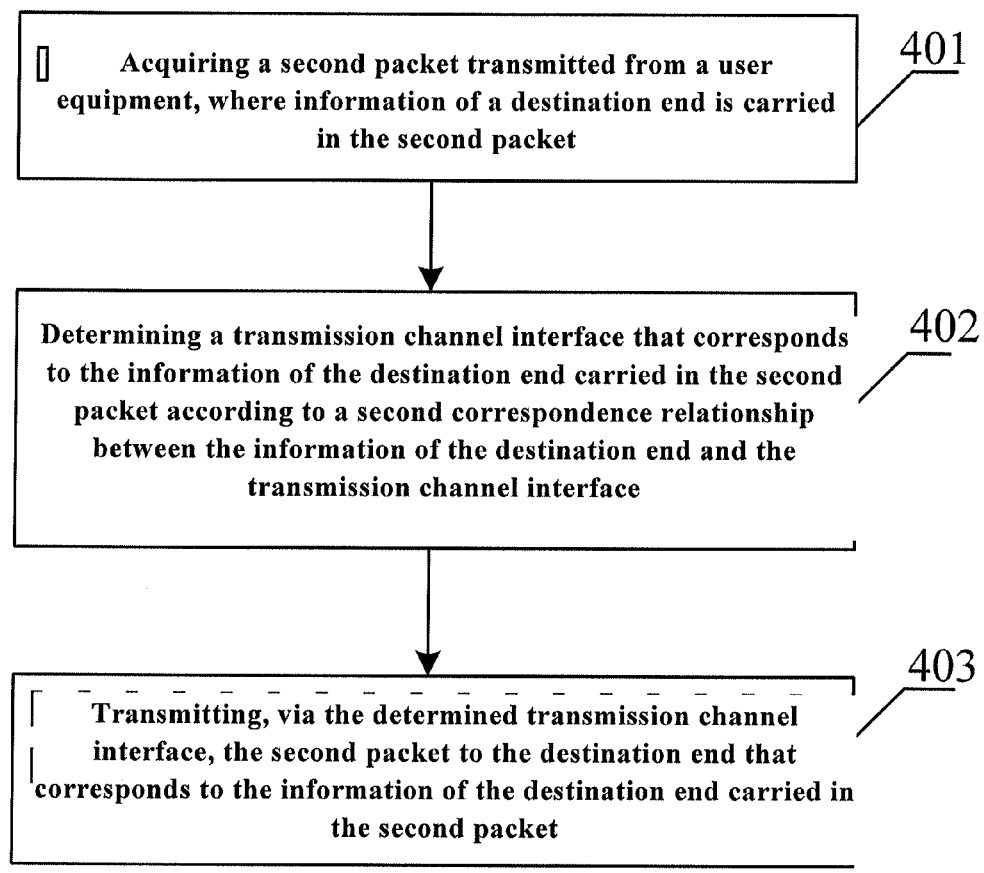
FIG. 4 is a flowchart showing another method for offloading processing service provided by an embodiment of the invention.

Referring to FIG. 4, an embodiment of the invention provides a method for offloading processing service, which comprises the steps as follows.

401. A second packet transmitted from a user equipment is acquired, wherein the second packet carries therein information of a destination end.

Here, the entity which carries out the embodiment of the invention may be a network element of an access network (more specifically, can be a network element of a Radio Access Network (RAN)), an SGSN or a GGSN. Among others, the network element of the access network may be a base station Node B or a RNC.

The second packet acquired in this step may be either a packet with payload data or a packet without payload data. The packet without payload data may be a TCP link establishment request message.

402. The transmission channel interface that corresponds to the information of the destination end carried in the second packet is determined according to a second correspondence relationship between information of destination ends and transmission channel interfaces.

The correspondence relationship between information of destination ends and transmission channel interfaces can be statically configured or dynamically configured. When the correspondence relationship between information of destination ends and transmission channel interfaces is dynamically configured, specifically, before this step, the network element of the access network captures a packet transmitted from any user equipment toward the destination end that is requested for access (referred to as the first packet), then identifies the service type of the first packet, determines the transmission channel interface that corresponds to the identified service type according to the first correspondence relationship between service types and transmission channel interfaces, and set up the second correspondence relationship between the information of the destination end carried in the first packet and the determined transmission channel interface. Here, the first and second packets are two packets that are acquired at different time. The first packet may be the packet with payload data in the subsequent step 503 and the second packet may be the packet captured in the subsequent step 506.

The information of the destination end comprises double information consisting of the IP address and the port number of the server, or alternatively, triple information consisting of the IP address and the port number of the server as well as the transmission layer protocol. In other words, the information of the destination end includes the IP address and the port number of the destination end. Optionally, the information of the destination end can further include the transmission layer protocol.

403. The second packet is transmitted, via the determined transmission channel interface, to the destination end that corresponds to the information of the destination end carried in the second packet.

The destination end that corresponds to the information of the destination end carried in the second packet can be a server which the user equipment requests for access and which provides service to the user equipment.

The destination end that corresponds to the information of the destination end carried in the second packet can also be another user equipment.

Accordingly, according to the embodiment of the invention, after the network element of the access network captures the packet transmitted from the user equipment, it determines the transmission channel interface via which the packet will be forwarded according to the correspondence relationship between the information of the server and the transmission channel interface. Since the correspondence relationship between the information of the server and the transmission channel interface is the correspondence relationship between the server and a transmission channel interface that corresponds to the service type of a packet transmitted previously to the server by any user equipment, and the traditional services and the networking services can correspond to different transmission channel interfaces, it is possible to offload the networking services from the traditional services without any user's intervention on APN setting.

Figure 5:
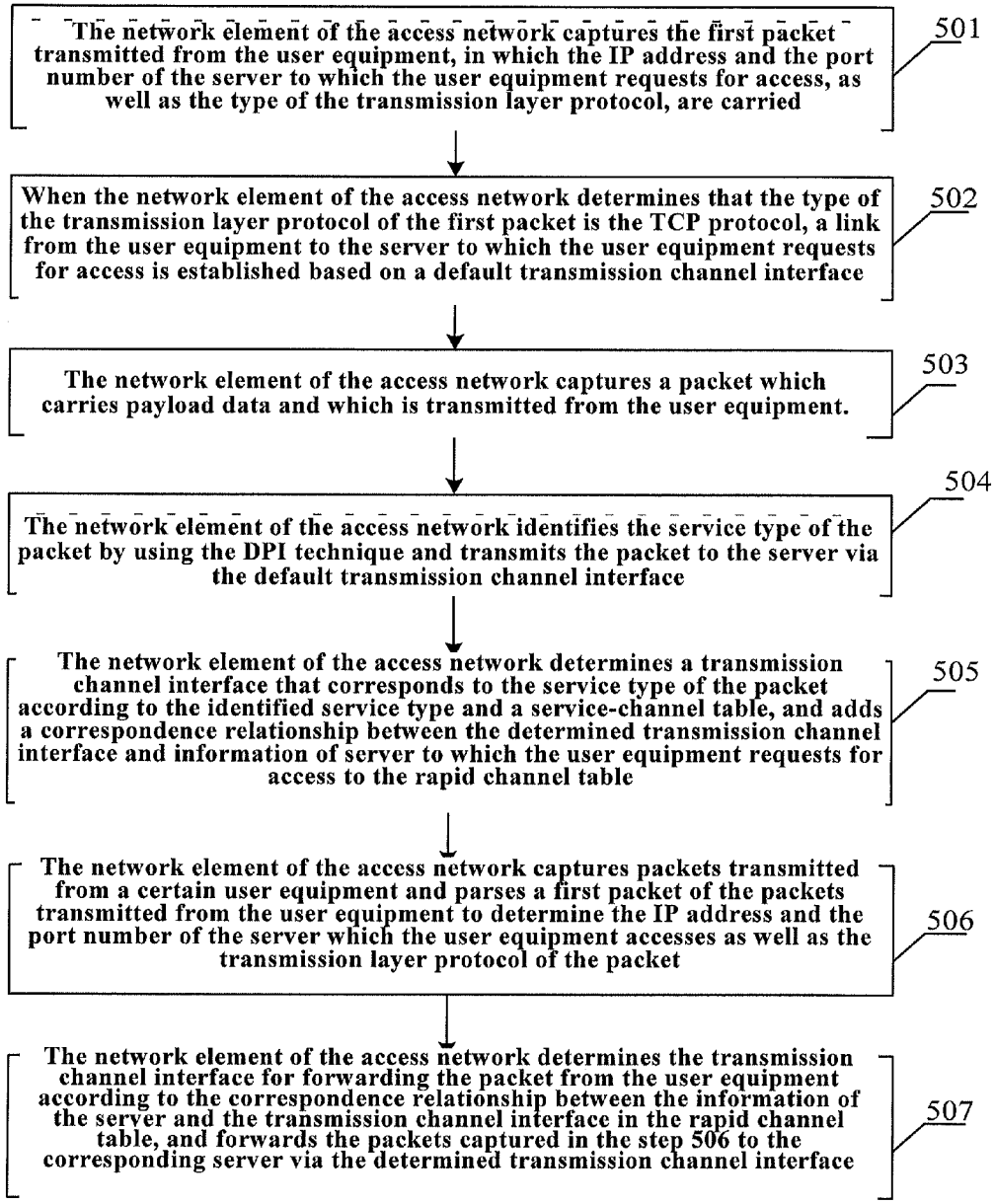
FIG. 5 is a flowchart showing a method for offloading processing service by using a rapid channel table provided by an embodiment of the invention.

The above mentioned technical solutions provided by the present invention will be described in detail with reference to the following embodiment as illustrated in FIG. 5 in order for a clearer understanding of the technical solutions provided by the embodiments of the present invention.

FIG. 5 illustrates a method for offloading processing service by using a Rapid Channel Table provided by an embodiment of the invention. The method comprises the steps as follows.

501. A network element of an access network captures the first packet transmitted from a user equipment. This packet carries therein the IP address and the port number of a server which the user equipment requests for access as well as the type of the transmission layer protocol.

502. When the network element of the access network determines that the type of the transmission layer protocol of the first packet is the TCP protocol, a connection from the user equipment to the server to which the user equipment requests for access is established based on a default transmission channel interface.

In this step, the default transmission channel interface can be an Iub interface.

503. The network element of the access network captures a packet carrying payload data and transmitted from the user equipment.

It is to be noted that if the network element of the access network determines that the transmission layer protocol of the first packet is the UDP protocol in S502, no link needs to be established and the first packet is the packet with payload data, and the steps 502 and 503 are skipped to perform step 504.

504. The network element of the access network identifies the service type of the packet with payload data by using the DPI technique and transmits the packet with payload data to the server via the default transmission channel interface.

Specifically, the service type of the packet is identified by way of characteristic identification, behaviour identification, suggestive identification or association identification.

505. The network element of the access network determines the transmission channel interface that corresponds to the service type of the packet according to the identified service type and the service-channel table, and adds to the rapid channel table the correspondence relationship between the determined transmission channel interface and the information of the server to which the user equipment requests for access, so as to determine the transmission channel interface for the subsequently captured packets to be transmitted to the server by using the rapid channel table.

Specifically, the information of the server comprises double information consisting of the IP address and the port number of the server, or alternatively, triple information consisting of the IP address and the port number of the server as well as the transmission layer protocol applicable to the packet with payload data. In other words, the information of the server includes the IP address and the port number of the server. Optionally, the information of the server can further include the transmission layer protocol.

Correspondence relationship between the information of the server and the transmission channel interface is stored in the rapid channel table, in which the transmission channel interface that corresponds to the information of the server is the optimal transmission channel interface for transmitting packets which interact with the server. If the transmission channel interface that corresponds to the information of the server is null or an invalid value, it means that the service or traffic is to be interrupted. More specifically, the rapid channel table is shown in Table 2.

TABLE 2

| INFORMATION OF SERVER | TRANSMISSION CHANNEL INTERFACE |
|---|---|
| 10.70.145.122: 123 | Iub |
| 10.71.145.156: 50 | Iub |
| 10.71.145.156: 80 | Gi |
| 10.202.100.215: 5286 | |
| 10.202.183.152: 40298 | Gi |

506. The network element of the access network captures a packet transmitted from a certain user equipment and parses the packet to obtain the IP address and the port number of the server to which the user equipment requests for access as well as the transmission layer protocol of the packet.

507. The network element of the access network determines the transmission channel interface for forwarding the packet from the user equipment according to the correspondence relationship between the information of the server and the transmission channel interface in the rapid channel table, and forwards the packet to the corresponding server via the determined transmission channel interface.

Accordingly, according to the embodiment of the invention, the network element of the access network determines the transmission channel interface that corresponds to the information of the server carried in the packet according to the correspondence relationship between information of servers and transmission channel interfaces, and forwards the packet via the transmission channel interface. Because the correspondence relationship between information of the server and transmission channel interfaces is the correspondence relationship between the server and a transmission channel interface that corresponds to the service type of a packet carrying payload data and transmitted previously to the server by any user equipment, and the traditional services and the networking services can correspond to different transmission channel interfaces (i.e., the server providing networking services corresponds to the Gi interface and the server providing the traditional services corresponds to the Iub interface), it is possible to rapidly offload the networking services from the traditional services without any user's intervention on APN setting.

Figure 6:
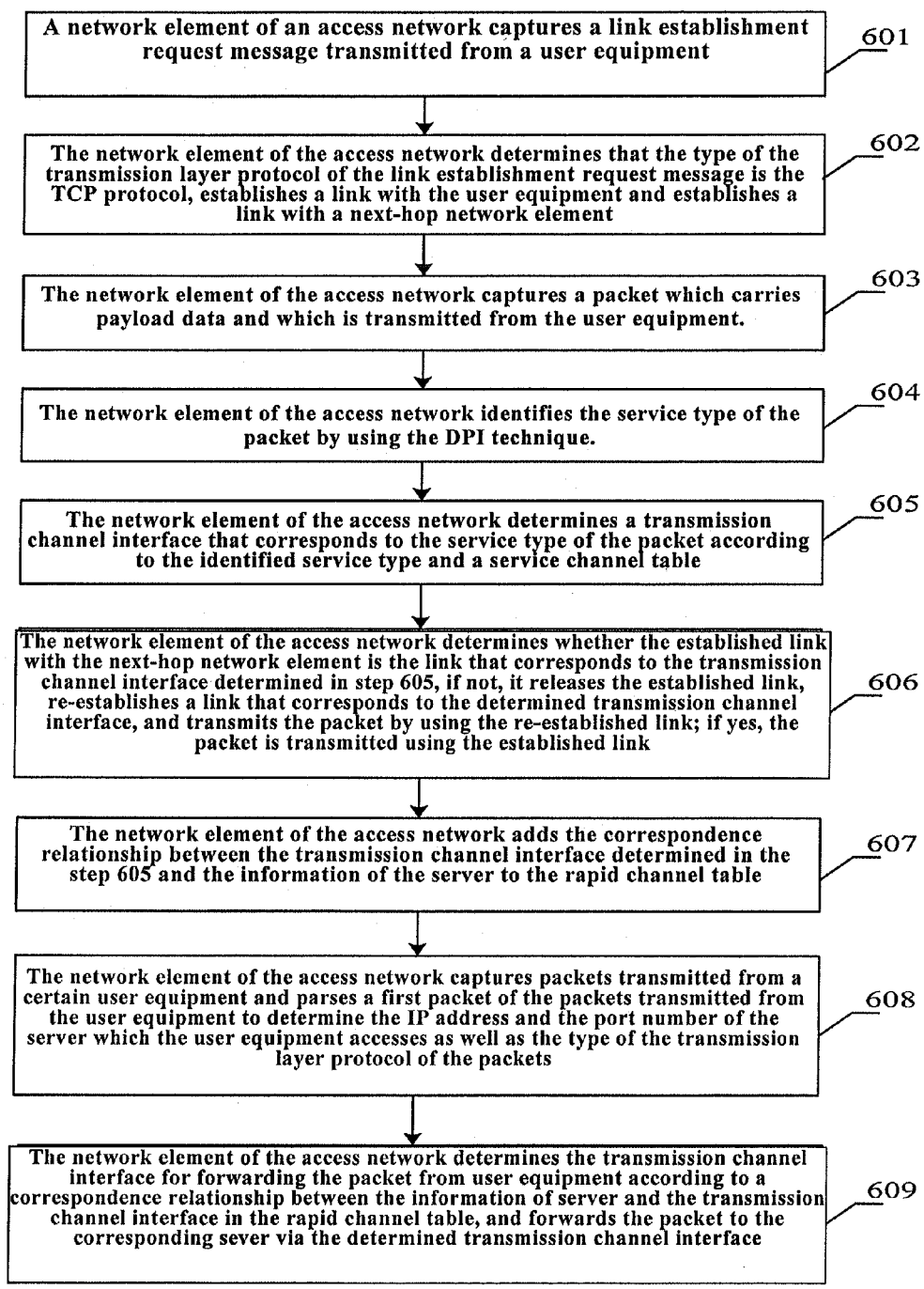
FIG. 6 is a flowchart showing still another method for offloading processing service provided by an embodiment of the invention.

FIG. 6 illustrates a method for offloading processing service provided by another embodiment of the invention. This method is derived by combining the technical solutions of the embodiment illustrated in FIG. 2 and the embodiment illustrated in FIG. 5. With this method, the first received packet with payload data destined to a certain server is transmitted by using a transmission channel interface that corresponds to the service type of the packet, and the correspondence relationship between the address of the server and the transmission channel interface is recorded. For any packets subsequently transmitted to this server, the transmission channel interface that corresponds to the double or triple information of the server terminal in the subsequent packet is determined directly according to the recorded correspondence relationship between the address of the server and the transmission channel interface. The method comprises the steps as follows.

The description of the steps 601-606 is omitted as they are similar to the steps 201-206.

607. The network element of the access network adds the correspondence relationship between the transmission channel interface determined in the step 605 and the information of the server to which the user equipment requests for access to the rapid channel table.

608. The network element of the access network captures packets transmitted from a certain user equipment and parses a first packet of packets received from the user equipment to obtain the IP address and the port number of the server which the user equipment accesses as well as the transmission layer protocol of the packet.

609. The network element of the access network determines the transmission channel interface for forwarding the packet from the user equipment according to the correspondence relationship between the information of the server and the transmission channel interface in the rapid channel table, and forwards the packet to the sever via the determined transmission channel interface.

Specifically, if it is determined that the transmission layer protocol of the packet is the TCP protocol by parsing the first IP packet, the first IP packet is forwarded to the server based on the determined transmission channel interface, so as to establish a link from the user equipment to the server. The subsequent packets with payload data, which are generally the fourth and subsequent IP packets, will be forwarded over the established link.

Alternatively, the above solution can also be carried out with the UDP protocol, specifically by combining the technical solutions of the embodiment illustrated in FIG. 3 and the embodiment illustrated in FIG. 5. Since the method of combining is similar to that in the above-stated embodiment, the description thereof is omitted here.

Accordingly, according to the embodiment of the invention, the first received packet with payload data destined to a certain server is transmitted via the transmission channel interface that corresponds to the service type of that packet, and then the correspondence relationship between the address of the server and the transmission channel interface is recorded. For the subsequent packets destined to that server, the transmission channel interface is determined directly according to the recorded correspondence relationship between the information of the server and the transmission channel interface, and the packets are forwarded. As a result, it is possible to offload the networking services from the traditional services without any user's intervention on APN setting and rapid offloading of services and saving of network sources can be achieved.

Figure 7:
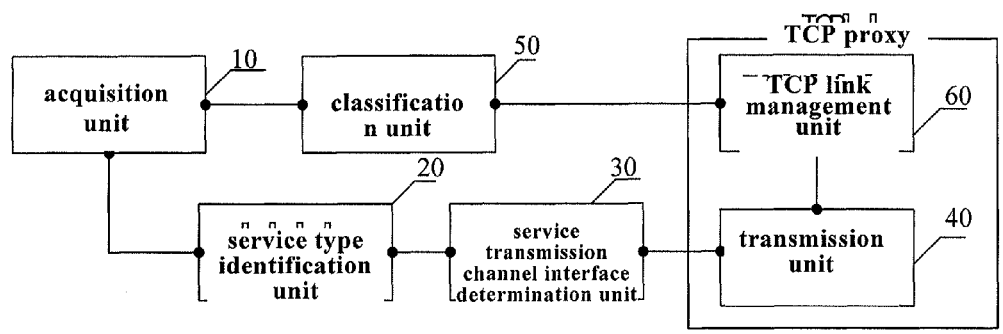
FIG. 7 is a structural diagram of a network element of an access network provided by an embodiment of the invention.

Referring to FIG. 7, an embodiment of the invention provides a communication apparatus which comprises:
  an acquisition unit 10 for acquiring a first packet carrying payload data and transmitted from a user equipment;
  a service type identification unit 20 for identifying a service type of the first packet by using DPI technique;
  a service transmission channel interface determination unit 30 for determining a transmission channel interface that corresponds to the identified service type according to a first correspondence relationship between service types and transmission channel interfaces;
  it should be noted that the first correspondence relationship between service types and transmission channel interfaces can be configured in advance or dynamically obtained; and
  a transmission unit 40 for transmitting, via the determined transmission channel interface, the first packet to the destination end to which the user equipment requests for access.

Here, the communication apparatus according to the embodiment of the invention can be a network element of an access network (more specifically, can be a network element of a Radio Access Network (RAN)), an SGSN or a GGSN. Among others, the network element of the access network may be a base station Node B or a RNC.

Optionally, in an embodiment, the acquisition unit 10 is also configured to acquire a link establishment request message transmitted from the user equipment in order to meet different requirements by different transmission layer protocol for establishment of links.

Correspondingly, the communication apparatus according to the embodiment of the invention can further comprise:
  a classification unit 50 for determining a protocol type of a transmission layer protocol carried in the link establishment request message;
  a TCP link management unit 60 for establishing a link from the TCP link management unit to the user equipment and establishing a link from the TCP link management unit to a next-hop network element when the transmission layer protocol carried in the link establishment request message is the TCP protocol; for releasing the established link from the TCP link management unit to the next-hop network element and re-establishing a link from the TCP link management unit to the destination end via the determined transmission channel interface when the established link from the TCP link management unit to the next-hop network element is not the link that corresponds to the determined transmission channel interface, wherein the transmission unit 40 transmits the first packet to the destination end to which the user equipment requests for access over the re-established link via the determined transmission channel interface, at which time the TCP link management unit 60 and the transmission unit 40 are located in a TCP Proxy.

Figure 8:
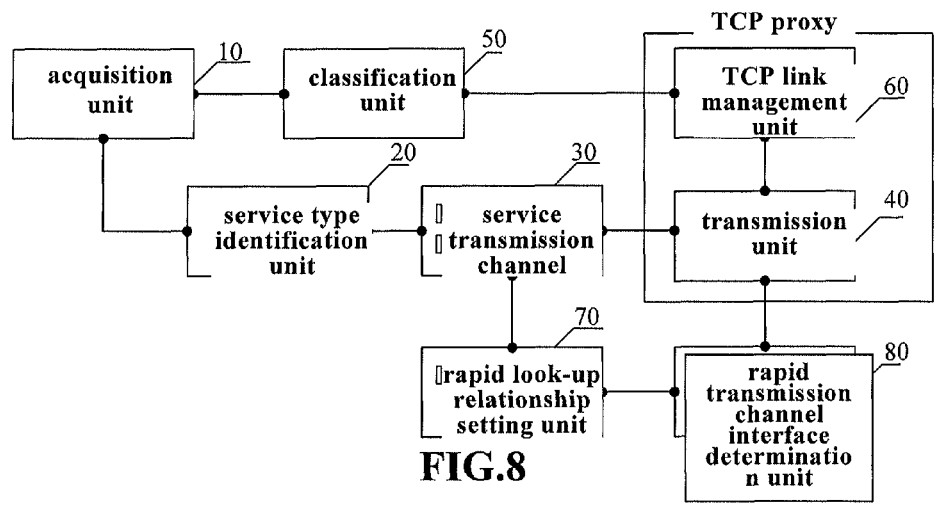
FIG. 8 is a structural diagram of another network element of an access network provided by an embodiment of the invention.

Optionally, referring to FIG. 8, in another embodiment of the invention, to facilitate rapid offloading of the subsequent packets destined to the same server, the communication apparatus can further comprise: a rapid look-up relationship setting unit 70 for setting up a second correspondence relationship between information of the destination end carried in the first packet and the transmission channel interface determined by the service transmission channel interface determination unit 30; wherein the information of the destination end includes an IP address and a port number of the destination end, optionally, the information of the destination end further includes a transmission layer protocol;

a rapid transmission channel interface determination unit 80 for parsing the information of the destination end from a second packet after the second packet is acquired; determining a transmission channel interface that corresponds to the information of the destination end according to the second correspondence relationship; correspondingly, the transmission unit 40 is further configured to transmit the second packet to the destination end via the transmission channel interface determined by the rapid transmission channel interface determination unit 80.

Accordingly, after capturing a packet carrying payload data and transmitted from the user equipment, the communication apparatus according to the embodiment of the invention determines the service type of the packet by using the DPI technique, determines a corresponding transmission channel interface according to a predetermined relationship between the service type and the transmission channel interface, and transmits the packet by using the corresponding transmission channel interface. As a result, since the traditional services and the networking services can correspond to the respective transmission channel interfaces, it is possible to offload the networking services from the traditional services without any user's intervention on APN setting.

Figure 9:
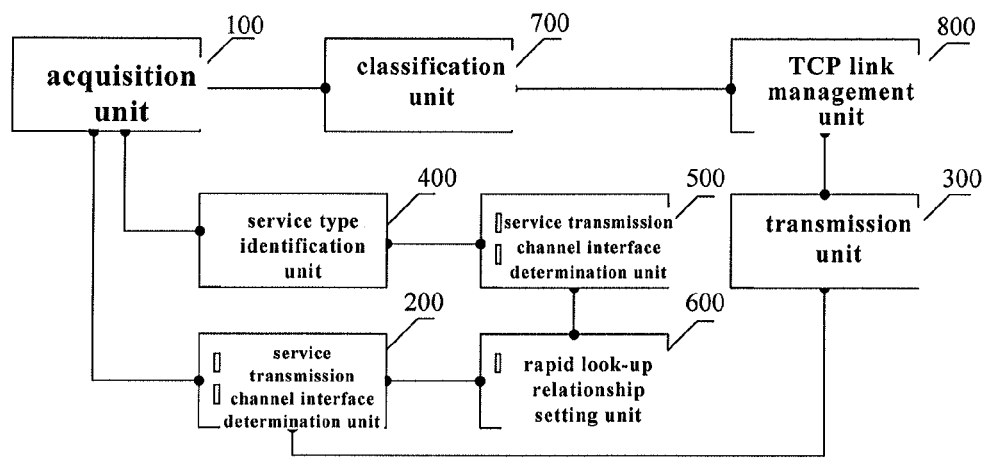
FIG. 9 is a structural diagram of still another network element of an access network provided by an embodiment of the invention.

Referring to FIG. 9, an embodiment of the invention provides another communication apparatus which comprises:

an acquisition unit 100 for acquiring a second packet transmitted from a user equipment, wherein the second packet carries therein information of a destination end;

a rapid transmission channel interface determination unit 200 for determining a transmission channel interface that corresponds to the information of the destination end carried in the second packet according to a second correspondence relationship between the information of the destination end and the transmission channel interface;

a transmission unit 300 for transmitting the packet to the destination end that corresponds to the information of the destination end carried in the second packet via the determined transmission channel interface.

In an implementation, the acquisition unit 100 is further configured to acquire a first packet with payload data;

optionally, in order to dynamically set up the second correspondence relationship between the information of the destination end and the transmission channel interface, the communication apparatus can further comprise:

a service type identification unit 400 for identifying a service type of the first packet with payload data by using Deep Packet Inspection (DPI) technique;

a service transmission channel interface determination unit 500 for determining a transmission channel interface that corresponds to the service type identified by the service type identification unit 400 according to the first correspondence relationship between the service type and the transmission channel interface;

a rapid look-up relationship setting unit 600 for setting up a second correspondence relationship between the information of the destination end carried in the first packet and the transmission channel interface determined by the service transmission channel interface determination unit 500. In an implementation, the correspondence relationship between the service type and the transmission channel interface is preconfigured on the communication apparatus.

Optionally, in order to meet different requirements by different transmission layer protocols for establishment of links, in an embodiment, the acquisition unit 100 is further configured to capture a link establishment request message transmitted from the user equipment, and the communication apparatus further comprises: a classification unit 700 for determining a protocol type of a transmission layer protocol carried in the link establishment request message; a TCP link management unit 800 for establishing a link from the user equipment to the server that corresponds to the information of the server carried in the packet based on the transmission channel interface determined by the rapid transmission channel interface determination unit 200 when the transmission layer protocol carried in the link establishment request message is the TCP protocol. The transmission unit 300 is specifically configured to transmit the packet to the destination end that corresponds to the information of the destination end carried in the second packet over the established link.

Here, the communication apparatus according to the embodiment of the invention can be a network element of an access network (more specifically, can be a network element of a Radio Access Network (RAN)), an SGSN or a GGSN. Among others, the network element of the access network can be a base station Node B or a RNC.

Accordingly, after capturing a packet transmitted from the user equipment, the communication apparatus according to the embodiment of the invention determines a transmission channel interface for forwarding the packet according to a correspondence relationship between the information of the server and the transmission channel interface. Since the correspondence relationship between the information of the server and the transmission channel interface is the correspondence relationship between the server and a transmission channel interface that corresponds to a service type of a packet transmitted previously to the server by any user equipment, and the traditional services and the networking services can correspond to different transmission channel interfaces, it is possible to offload the networking services from the traditional services without any user's intervention on APN setting.

Figure 10:
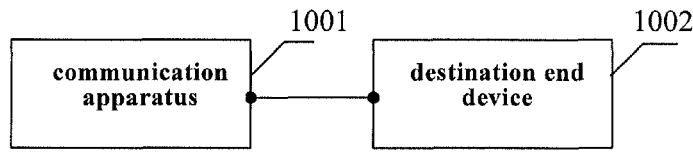
FIG. 10 is a structural diagram of a network system provided by an embodiment of the invention.

Referring to FIG. 10, an embodiment of the invention provides a network system which mainly comprises a communication apparatus 1001 and a destination end device 1002.

The configuration and functionality of the communication apparatus 1001 are similar to those in the embodiments as shown in FIGS. 7, 8 and 9 and the description thereof is omitted. The communication apparatus can be a network element of an access network (more specifically, can be a network element of a Radio Access Network (RAN)), an SGSN or a GGSN. The network element of the access network can be a base station Node B or a RNC.

The destination end device 1002 is configured to receive a packet transmitted by the communication apparatus 1001, where the packet is transmitted from a user equipment. the destination end device 1002 may be a server. When the packet is of a networking service, the server receives it from a direct link between a network element of an access network and the server, which is a link that does not pass through the GGSN and the SGSN in the mobile network. When the packet is of a traditional service, the server receive the packet transmitted from the user equipment via the GGSN and the SGSN in the mobile network.

Accordingly, after capturing a packet carrying payload data and transmitted from the user equipment, the communication apparatus according to the embodiment of the invention determines the service type of the packet by using the DPI technique and forwards the packet via a corresponding transmission channel interface according to a predetermined relationship between the service type and the transmission channel interface. As a result, since the traditional services and the networking services can correspond to the respective transmission channel interfaces, it is possible to offload the networking services from the traditional services without any user's intervention on APN setting. Alternatively, the communication apparatus according to the embodiment of the invention determines the corresponding transmission channel interface by using the correspondence relationship between the information of the server in the received packet and the transmission channel interface, and transmits the packet via this transmission channel interface. Because the servers providing different types of service correspond to different transmission channel interfaces (i.e., the server providing networking services corresponds to the Gi interface and the server providing the traditional services corresponds to the Iub interface), it is possible to rapidly offload the networking services from the traditional services without any user's intervention on APN setting.

Figure 11:
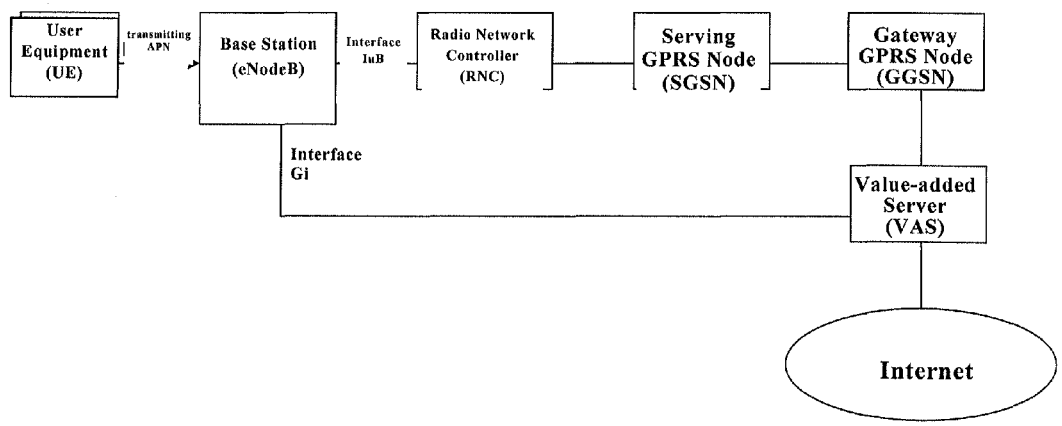
FIG. 11 is a schematic diagram showing a scenario of radio networking service provided by an embodiment of the invention.

A schematic diagram of actual networking of the network system according to an embodiment of the invention is illustrated in FIG. 11. Here, the communication apparatus is specifically the base station Node B or the RNC in FIG. 11.

It should be appreciated that it is possible to automatically Gi-Offload the traffic in the radio network based on the service type without any user's intervention by integrating a offloading processing service function provided by the embodiment of the invention into a Radio RAN side network element (a base station Node B or a RNC), as shown in FIG. 11.

Besides the implementation of integrating the offloading processing service functionality provided by the embodiments of the invention into the network element of the radio access network, the embodiment of the invention also provides an external service offloading apparatus operable to automatically Gi-offload the network traffic based on the service type without any user's intervention.

Figure 12:
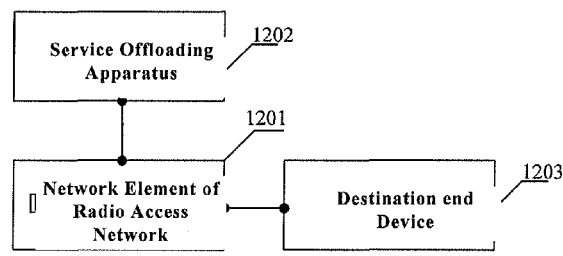
FIG. 12 is a structural diagram of another network system provided by an embodiment of the invention.

The embodiment of the invention also provides a network system as illustrated in FIG. 12, comprising: a network element 1201 of a radio access network, a service offloading apparatus 1202 and a destination end device 1203 in communication with the network element of the radio access network.

In the network system, the network element 1201 of the radio access network is configured to acquire a packet carrying payload data and transmitted from a user equipment and transmit the packet to a destination end device to which the user equipment requests for access via a transmission channel interface determined by the service offloading apparatus.

The service offloading apparatus 1202 is configured to identify the service type of the packet by using the DPI technique and determine the transmission channel interface that corresponds to the identified service type according to maintained correspondence relationship between service types and transmission channel interfaces. The destination end device 1203 is configured to receive the packet transmitted by the network element 1201 of the radio access network. Here, the destination end device 1203 can be the server to which the user equipment requests for access.

The network element of the radio access network according to the embodiment of the invention can be a base station Node B or an RNC.

Figure 13:
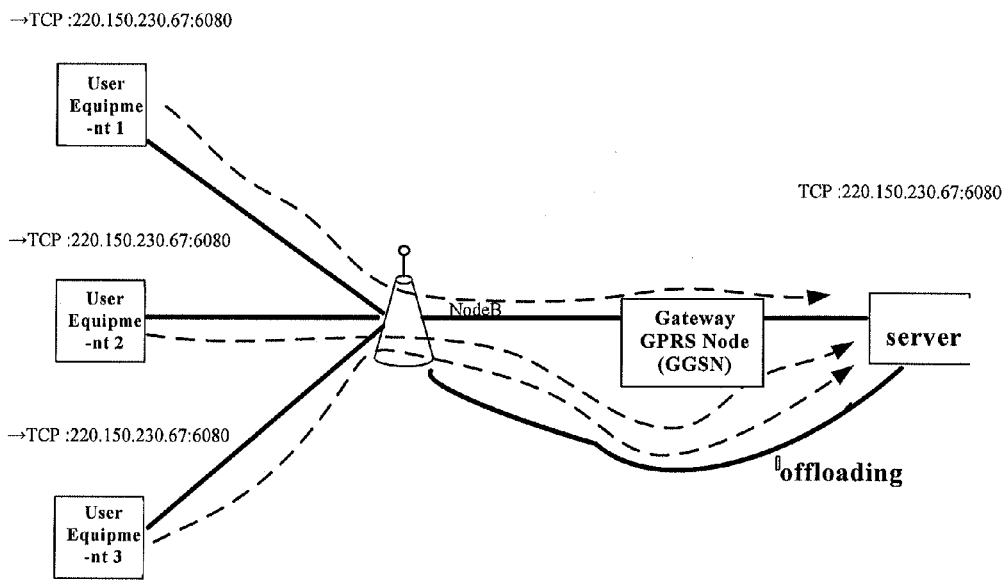
FIG. 13 is a schematic diagram showing offloading of radio networking service provided by the embodiment of the invention.

For a better understanding of the technical solution provided by the embodiment of the invention, an example is described. As shown in FIG. 13, it is assumed that the network element of the access network is a base station Node B which receives the packets transmitted from a user equipment 1, a user equipment 2 and a user equipment 3, respectively. The information of the destination server carried in the packets transmitted from the user equipment 1, the user equipment 2 and the user equipment 3 includes the IP address 220.150.230.67 of the server, the port number 6080 of the server and the TCP protocol applicable to the packet. Assuming that the base station Node B first receives a packet transmitted from the user equipment 1, forwards the packet to the server via a default transmission channel interface Iub, identifies the service type of the packet to be HTTP service by using the DPI technique, determines the transmission channel interface that corresponds to the service type to be an interface Gi according to the correspondence relationship between service types and transmission channel interfaces, and sets up correspondence relationship between the interface Gi and the information of the server in the packet transmitted from the user equipment 1. After the base station Node B receives a packet transmitted from the user equipment 2 and the user equipment 3 subsequently, the transmission channel interface that corresponds to the information of the destination server in the received packet is determined to be the interface Gi and the packet will be forwarded to the server via the interface Gi. Thus, the traffic can be Gi-offloaded in the base station Node B.

It is to be noted that the words "first" and "second" used in the description of the embodiments are just for the distinguishing purposes instead of any sequential limitation.

It should be appreciated that all or part of the process(es) in methods according to the above-described embodiments can be implemented by computer programs instructing relevant hardware elements (e.g., a processor). The computer programs can be stored in a computer readable storage medium and can embody the process(es) of the method(s) according to the embodiment(s) of the invention when being executed. Among others, the storage medium can be a magnetic disk, an optical disc, a Read-Only Memory (ROM), a Random Access Memory (RAM) or the like. Detailed description of the method of offloading processing service, the network element of the access network and the network system provided by the embodiments of the invention has been presented as above. The principle and embodiments of the invention have been explained with reference to specific examples, which are presented solely to facilitate understanding of the method and key point of the invention. Nevertheless, changes can be made to the embodiments and applications of the inventive idea of the invention by an ordinarily skilled person in the art. Therefore, the specification may not be construed as any restriction to the scope of protection of the invention.

What is claimed is:
1. A method for offloading processing service, comprising:
acquiring a first packet carrying payload data and transmitted wirelessly from a user equipment;
identifying a service type of the first packet by using Deep Packet Inspection DPI technique;
determining a transmission channel interface that corresponds to the identified service type according to a first correspondence relationship between service types and transmission channel interfaces; and transmitting, via the determined transmission channel interface, the first packet to a destination end to which the user equipment requests for access;
wherein before the acquiring a first packet carrying payload data and transmitted wirelessly from the user equipment, further comprising:
acquiring a link establishment request message transmitted from the user equipment; and
establishing, if it is determined that a transmission layer control protocol TCP connection is needed to be established according to the link establishment request message, a link from the network element of the access network to the user equipment and a link from the network element of the access network to a next-hop network element;
wherein before the transmitting, via the determined transmission channel interface, the first packet to the destination end to which the user equipment requests for access, further comprising:
releasing, if the established link from the network element of the access network to the next-hop network element is not the link that corresponds to the determined transmission channel interface, the established link from the network element of the access network to the next-hop network element and re-establishing a link from the network element of the access network to the destination end via the determined transmission channel interface;
wherein the transmitting, via the determined transmission channel interface, the first packet to the destination end to which the user equipment requests for access comprising:
transmitting, over the re-established link via the determined transmission channel interface, the first packet to the destination end to which the user equipment requests for access.

2. The method according to claim 1, further comprising, after the process of determining the transmission channel interface that corresponds to the identified service type:
setting up a second correspondence relationship between information of the destination end carried in the first packet and the determined transmission channel interface;
parsing the information of the destination end from a second packet after the second packet is acquired;
determining a transmission channel interface that corresponds to the information of the destination end according to the second correspondence relationship; and
transmitting the second packet to the destination end via the transmission channel interface that corresponds to the information of the destination end.

3. A communication apparatus, comprising:
a memory having instructions stored therein,
a processor coupled with the memory, wherein the instructions configure the processor to:
acquire a first packet carrying payload data and transmitted wirelessly from a user equipment;
identify a service type of the first packet by using Deep Packet Inspection DPI technique;
determine a transmission channel interface that corresponds to the identified service type according to a first correspondence relationship between service types and transmission channel interfaces; and
transmit, via the determined transmission channel interface, the first packet to the destination end to which the user equipment requests for access;
wherein the processor is further configured to:
acquire a link establishment request message transmitted from the user equipment,
determine a protocol type of a transmission layer protocol carried in the link establishment request message;
establish a link from the communication apparatus to the user equipment and a link from communication apparatus to a next-hop network element if the transmission layer protocol carried in the link establishment request message is the TCP protocol; releasing the established link from the communication apparatus to the next-hop network element and re-establishing a link from the communication apparatus to the destination end via the determined transmission channel interface if the established link from the communication apparatus to the next-hop network element is not the link that corresponds to the determined transmission channel interface, and
transmit, over the re-established link via the determined transmission channel interface, the first packet to the destination end to which the user equipment requests for access.

4. The communication apparatus according to claim 3, wherein the processor is further configured to:
set up a second correspondence relationship between information of the destination end carried in the first packet and the transmission channel interface determined;
parse the information of the destination end from a second packet after the second packet is acquired; determine a transmission channel interface that corresponds to the information of the destination end according to the second correspondence relationship, and
acquire the second packet transmitted from the user equipment, wherein the information of the destination end is carried in the second packet, and transmit the second packet to the destination end via the transmission channel interface determined.

5. The method according to claim 1, further comprising, after the process of determining the transmission channel interface that corresponds to the identified service type:
setting up a second correspondence relationship between information of the destination end carried in the first packet and the determined transmission channel interface;
parsing the information of the destination end from a second packet after the second packet is acquired;
determining a transmission channel interface that corresponds to the information of the destination end according to the second correspondence relationship; and
transmitting the second packet to the destination end via the transmission channel interface that corresponds to the information of the destination end.

6. The communication apparatus according to claim 3, wherein the processor is further configured to:
set up a second correspondence relationship between information of the destination end carried in the first packet and the transmission channel interface determined;
parse the information of the destination end from a second packet after the second packet is acquired; and determine a transmission channel interface that corresponds to the information of the destination end according to the second correspondence relationship, and
acquire the second packet transmitted from the user equipment, wherein the information of the destination end is carried in the second packet, and the second packet is transmitted to the destination end via the transmission channel interface determined.

\* \* \* \* \*